US011332180B2

(12) United States Patent
Crumrine et al.

(10) Patent No.: US 11,332,180 B2
(45) Date of Patent: May 17, 2022

(54) STROLLER HAVING COMPACT FOLDING AND SUSPENSION SYSTEM

(71) Applicant: Guava Family, Inc., Solana Beach, CA (US)

(72) Inventors: Scott Crumrine, Solana Beach, CA (US); Asa Giffin, Solana Beach, CA (US)

(73) Assignee: Guava Family, Inc., Solana Beach, CA (US)

( * ) Notice: Subject to any disclaimer, the term of this patent is extended or adjusted under 35 U.S.C. 154(b) by 0 days.

(21) Appl. No.: 17/161,566

(22) Filed: Jan. 28, 2021

(65) Prior Publication Data
US 2021/0229727 A1    Jul. 29, 2021

Related U.S. Application Data

(60) Provisional application No. 62/967,466, filed on Jan. 29, 2020.

(51) Int. Cl.
*B62B 7/06* (2006.01)
*B62B 7/04* (2006.01)

(52) U.S. Cl.
CPC .............. *B62B 7/062* (2013.01); *B62B 7/044* (2013.01)

(58) Field of Classification Search
CPC ...... B62B 7/044; B62B 7/06–062; B62B 7/08
See application file for complete search history.

(56) References Cited

U.S. PATENT DOCUMENTS

| 2,901,755 A | 9/1959 | Wood |
| 2,992,441 A | 7/1961 | Landry |
| (Continued) | | |

FOREIGN PATENT DOCUMENTS

| CA | 2 174 365 C | 4/2005 |
| CA | 2 848 665 A1 | 3/2008 |
| (Continued) | | |

OTHER PUBLICATIONS

*G5 Stroller*, (n.d.). Orbit Baby. Retrieved Jun. 4, 2021, from https://orbitbabyusa.com/products/g5-stroller-black-fame-melange-grey-seat-1. 1 page.

(Continued)

*Primary Examiner* — Erez Gurari
(74) *Attorney, Agent, or Firm* — Mintz Levin Cohn Ferris Glovsky amd Popeo, P.C.

(57) ABSTRACT

Various embodiments of a collapsible stroller configured to form at least a compact collapsed configuration are described. In some embodiments, the collapsible stroller includes a foldable frame assembly including a top frame pivotably coupled to a bottom frame such that the top frame is allowed to pivot along a longitudinal plane of the foldable frame assembly. The foldable frame assembly can include first strut assemblies pivotably coupled to the bottom frame at respective angled joints. The angled joints can each include a first axis of rotation that is angled relative to the longitudinal plane such that the strut assemblies pivot towards the longitudinal plane as the top frame pivots towards the bottom frame for forming the collapsed configuration. In some embodiments, the foldable frame assembly further includes a suspension system that also can pivot towards the longitudinal plane when the foldable frame assembly forms the collapsed configuration.

14 Claims, 10 Drawing Sheets

(56) References Cited

U.S. PATENT DOCUMENTS

| | | | |
|---|---|---|---|
| 3,796,439 A * | 3/1974 | Perego | B62B 7/08 280/644 |
| 4,070,716 A | 1/1978 | Satt et al. | |
| 4,376,318 A | 3/1983 | Cirillo | |
| 4,412,688 A * | 11/1983 | Giordani | B62B 7/08 280/47.4 |
| 4,645,370 A | 2/1987 | Kassai | |
| 4,651,367 A | 3/1987 | Osher et al. | |
| 5,363,521 A | 11/1994 | Garland et al. | |
| 5,364,119 A * | 11/1994 | Leu | B62B 7/06 280/647 |
| 5,474,316 A | 12/1995 | Britton | |
| 5,562,300 A * | 10/1996 | Nelson | B62B 7/04 280/47.38 |
| 5,577,746 A | 11/1996 | Britton | |
| 5,615,427 A | 4/1997 | Huang | |
| 5,727,265 A | 3/1998 | Ziegler et al. | |
| 5,863,061 A * | 1/1999 | Ziegler | B62B 7/08 280/642 |
| 5,887,889 A * | 3/1999 | Andrus | B62B 7/06 280/647 |
| 6,315,309 B1 * | 11/2001 | Li | B62B 7/08 188/19 |
| 6,625,826 B1 | 9/2003 | Cheng | |
| 6,767,028 B2 | 7/2004 | Britton et al. | |
| 6,976,697 B2 | 12/2005 | Britton et al. | |
| 7,168,761 B2 | 1/2007 | Britton et al. | |
| D545,074 S | 6/2007 | Loew et al. | |
| D592,109 S | 5/2009 | Loew et al. | |
| D594,678 S | 6/2009 | Loew et al. | |
| 7,547,029 B2 | 6/2009 | Britton et al. | |
| 7,789,413 B2 | 9/2010 | Hei et al. | |
| 8,006,992 B2 | 8/2011 | Britton | |
| 8,020,879 B1 * | 9/2011 | Engdahl | B62B 9/14 280/30 |
| 8,182,033 B2 | 5/2012 | Hei et al. | |
| 8,210,550 B2 | 7/2012 | White et al. | |
| 8,251,457 B2 | 8/2012 | Britton et al. | |
| 8,262,103 B2 | 9/2012 | Enserink et al. | |
| D683,974 S | 6/2013 | Leys et al. | |
| 8,511,749 B2 | 8/2013 | Hei et al. | |
| 8,678,424 B2 | 3/2014 | Fleming et al. | |
| 8,714,582 B2 | 5/2014 | Hei et al. | |
| 8,894,090 B1 * | 11/2014 | Chen | B62B 7/068 280/647 |
| 9,050,989 B2 | 6/2015 | Fleming et al. | |
| D749,990 S | 2/2016 | Reinius et al. | |
| 9,315,206 B2 | 4/2016 | Fleming | |
| 9,469,370 B2 | 10/2016 | Britton et al. | |
| 9,481,389 B2 | 11/2016 | Leys et al. | |
| D793,914 S | 8/2017 | Eriksson et al. | |
| 9,908,552 B2 | 3/2018 | Fleming et al. | |
| 10,167,008 B1 | 1/2019 | Yang | |
| 10,370,017 B1 * | 8/2019 | Ogrin | B62B 7/08 |
| 10,383,457 B2 | 8/2019 | Crumrine | |
| 10,442,452 B2 | 10/2019 | Fleming et al. | |
| 10,583,854 B2 | 3/2020 | Fleming et al. | |
| D889,323 S | 7/2020 | Reinius et al. | |
| 10,864,934 B2 | 12/2020 | Fleming et al. | |
| 2004/0075247 A1 * | 4/2004 | Lin | B62B 7/08 280/642 |
| 2007/0210544 A1 * | 9/2007 | Chen | B60B 33/0057 280/47.34 |
| 2007/0257526 A1 | 11/2007 | Hei et al. | |
| 2008/0034498 A1 | 2/2008 | Chen et al. | |
| 2008/0191451 A1 * | 8/2008 | Driessen | B62B 7/08 280/650 |
| 2009/0121455 A1 * | 5/2009 | Kretschmer | B62B 7/062 280/642 |
| 2009/0144896 A1 | 6/2009 | Chen et al. | |
| 2009/0302556 A1 | 12/2009 | White et al. | |
| 2009/0302578 A1 | 12/2009 | White et al. | |
| 2010/0045001 A1 | 2/2010 | Thorne et al. | |
| 2011/0012325 A1 * | 1/2011 | Gower | B62B 7/06 280/648 |
| 2012/0153583 A1 * | 6/2012 | Yuan | B62B 9/28 280/30 |
| 2013/0015691 A1 | 1/2013 | Feng et al. | |
| 2013/0097785 A1 | 4/2013 | Cicci | |
| 2013/0249202 A1 | 9/2013 | White et al. | |
| 2014/0300086 A1 * | 10/2014 | Yeh | B62B 7/08 280/650 |
| 2015/0076775 A1 * | 3/2015 | Wu | B62B 7/064 280/38 |
| 2015/0123381 A1 * | 5/2015 | Singh | B62B 3/02 280/650 |
| 2017/0043801 A1 * | 2/2017 | Wuerstl | B62B 7/006 |
| 2017/0174244 A1 * | 6/2017 | Sack | B62B 7/10 |
| 2018/0312188 A1 * | 11/2018 | Haut | B62B 7/08 |
| 2019/0118848 A1 * | 4/2019 | Driessen | B62B 9/104 |
| 2019/0210628 A1 * | 7/2019 | Zhao | B62B 9/26 |
| 2019/0291768 A1 * | 9/2019 | Canas | B62B 9/18 |
| 2020/0001908 A1 * | 1/2020 | Ambar | B62B 7/142 |
| 2020/0361506 A1 | 11/2020 | Singh et al. | |
| 2020/0385044 A1 * | 12/2020 | Singh | B62B 7/062 |

FOREIGN PATENT DOCUMENTS

| | | |
|---|---|---|
| CA | 2 208 809 C | 5/2009 |
| CA | 2 355 009 C | 12/2009 |
| CA | 2 403 336 C | 3/2010 |
| CA | 2 436 100 C | 7/2011 |
| CA | 2 440 739 C | 12/2012 |
| CA | 2 559 644 C | 6/2014 |
| CN | 2170040 Y | 6/1994 |
| CN | 2217343 Y | 1/1996 |
| CN | 2626318 Y | 7/2004 |
| CN | 101564247 A | 10/2009 |
| CN | 102396925 A | 4/2012 |
| CN | 110588758 A | 12/2019 |
| DE | 20 2017 002 773 U1 | 8/2017 |
| EP | 1 880 642 A1 | 1/2008 |
| EP | 2 684 769 A1 | 1/2014 |
| EP | 3 224 112 B1 | 7/2019 |
| EP | 3 747 730 A1 | 12/2020 |
| GB | 2 283 670 A | 5/1995 |
| WO | WO-2006/135299 A1 | 12/2006 |
| WO | WO-2007/036234 A1 | 4/2007 |

OTHER PUBLICATIONS

*Thule Spring*, (n.d.). Thule Group. Retrieved Jun. 4, 2021, from https://www.thule.com/en-us/strollers/city-strollers/thule-spring- -11300205. 1 page.

International Search Report and Written Opinion issued in International Application No. PCT/US2021/15563, dated May 7, 2021. 9 pages.

* cited by examiner

STROLLER HAVING COMPACT FOLDING AND SUSPENSION SYSTEM

CROSS-REFERENCE

This application claims priority under 35 U.S.C. § 119(a) to U.S. Provisional application Ser. No. 62/967,466, filed on Jan. 29, 2020 and entitled "STROLLER HAVING COMPACT FOLDING AND SUSPENSION SYSTEM," the disclosure of which is incorporated by reference herein in its entirety.

TECHNICAL FIELD

The subject matter described herein relates to various embodiments of a stroller having a foldable frame.

BACKGROUND

Strollers provide a number of uses, such as for transporting children and carrying objects. The ability to use strollers in various conditions allow for improved convenience and utility. For example, some strollers are configured to allow users to bring at least one child along during a run. Such jogging strollers can include a suspension system that contributes to a smoother ride for the child riding in the stroller. Although jogging strollers provide a number of benefits, one drawback with jogging strollers is their relatively large size, including when in a collapsed or folded configuration. Smaller and more compact collapsed stroller configurations allow for easier transport, such as in a car or in public transportation, as well as allow for improved storage.

SUMMARY

Aspects of the current subject matter include various embodiments of a stroller assembly including a foldable frame and suspension system. In one aspect, the stroller assembly can include a foldable frame assembly having a top frame including a handle bar. The foldable frame assembly can further include a bottom frame pivotably coupled to the top frame such that the top frame is allowed to pivot along a longitudinal plane of the foldable frame assembly. The foldable frame assembly can form a collapsed configuration as a result of the top frame pivoting towards the bottom frame, and the foldable frame assembly can form an extended configuration as a result of the top frame pivoting away from the bottom frame. The foldable frame assembly can further include a first strut assembly pivotably coupled to the bottom frame at a first angled joint. The first strut assembly can include a first rear wheel axle, and the first angled joint can include a first axis of rotation that is angled relative to the longitudinal plane such that the first rear wheel axle pivots towards the longitudinal plane as the top frame pivots towards the bottom frame for forming the collapsed configuration.

In some variations one or more of the following features can optionally be included in any feasible combination. The foldable frame assembly can further include a second strut assembly pivotably coupled to the bottom frame at a second angled joint. The second strut assembly can include a second rear wheel axle, and the second angled joint can include a second axis of rotation that is angled relative to the longitudinal plane such that the second rear wheel axis pivots towards the longitudinal plane as the top frame pivots towards the bottom frame. The first axis of rotation can form a first angle with the longitudinal plane, and the first angle can be approximately 70 degrees to approximately 80 degrees. The second axis of rotation can form a second angle with the longitudinal plane, and the second angle can be approximately 70 degrees to approximately 80 degrees. The first axis of rotation and the second axis of rotation can each extend along different planes.

The foldable frame assembly can further include a first suspension system including a first shock absorber, and the first suspension system can extend between the top frame and the first strut assembly. The foldable frame assembly can further include a second suspension system including a second shock absorber and can extend between the top frame and the second strut assembly. The first suspension system can be coupled to the first strut assembly via a first ball joint that allows three dimensional pivoting, and the first suspension system can be coupled to the top frame via a second ball joint that allows three dimensional pivoting. The three dimensional pivoting can allow the first suspension system and the first strut assembly to pivot towards the longitudinal plane as the top frame pivots towards the bottom frame.

The first rear wheel axis can be configured to couple a first rear wheel and the second rear wheel axis can be configured to couple a second rear wheel. The first rear wheel and the second wheel can form a first wheel distance therebetween when then the foldable frame assembly is in the collapsed configuration, and the first rear wheel and the second wheel can form a second wheel distance therebetween when then the foldable frame assembly is in the extended configuration. Additionally, the second wheel distance can be longer than the first wheel distance. The first wheel can be positioned parallel to the second wheel when the foldable frame assembly is in the extended configuration, and the first wheel can be positioned at an angle relative to the second wheel when the foldable frame assembly is in the collapsed configuration.

In some embodiments, the stroller assembly can further include a material seating portion coupled to the foldable frame assembly.

In another interrelated aspect of the current subject matter, a method includes forming a collapsed configuration of a foldable frame assembly of a stroller assembly. For example, the method can include pivoting, along a longitudinal plane of the foldable frame assembly, a top frame of the foldable frame assembly towards a bottom frame of the foldable frame assembly. The method can further include pivoting, as a result of the pivoting of the top frame towards the bottom frame, a first strut assembly and a first suspension assembly towards the longitudinal plane. Additionally, the method can include pivoting, as a result of the pivoting of the top frame towards the bottom frame, a second strut assembly and a second suspension assembly towards the longitudinal plane.

In some variations one or more of the following features can optionally be included in any feasible combination. The first strut assembly can pivot independently from the second strut assembly. The first strut assembly can be pivotably coupled to the bottom frame at a first angled joint, and the first strut assembly can include a first rear wheel axle. The first angled joint can include a first axis of rotation that is angled relative to the longitudinal plane to cause the first rear wheel axle to pivot towards the longitudinal plane as a result of the top frame pivoting towards the bottom frame.

The first axis of rotation can form a first angle with the longitudinal plane, and the first angle can be approximately 70 degrees to approximately 80 degrees. The first suspension system can include a first shock absorber and extend between the top frame and the first strut assembly. The first suspension system can be coupled to the first strut assembly via a first ball joint that allows three dimensional pivoting, and the first suspension system can be coupled to the top frame via a second ball joint that allows three dimensional pivoting. The three dimensional pivoting can allow the first suspension system and the first strut assembly to pivot towards the longitudinal plane as the top frame pivots towards the bottom frame.

The first rear wheel axis can be configured to couple a first rear wheel to the first strut assembly. The stroller assembly can further comprise a material seating portion coupled to the top frame and the bottom frame.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to various embodiments of a collapsible stroller having a foldable frame that includes folding features that allows the collapsible stroller to efficiently and effectively fold and collapse into a compact configuration. In some embodiments, the collapsible stroller can include a suspension system that can effectively absorb shock during use of the collapsible stroller. For example, the collapsible stroller can be transitioned between an extended configuration (e.g., in an unfolded state) and a collapsed configuration (e.g., in a folded state). Additionally, the extended state can allow for transporting a child (e.g., positioned along a material seat portion of the collapsible stroller) and the collapsed configuration can allow for storage of the collapsible stroller. The collapsible stroller described herein can be used in a variety of ways, such as for carrying a child being pushed by a user that is running or walking. Other uses of the stroller are within the scope of this disclosure.

In some embodiments, the collapsible stroller includes a foldable frame assembly including at least one angled joint assembly that assists with allowing the collapsible stroller to form an improved compact configuration, such as compared to at least some other currently available strollers, as will be described in greater detail below.

Figure 1A:
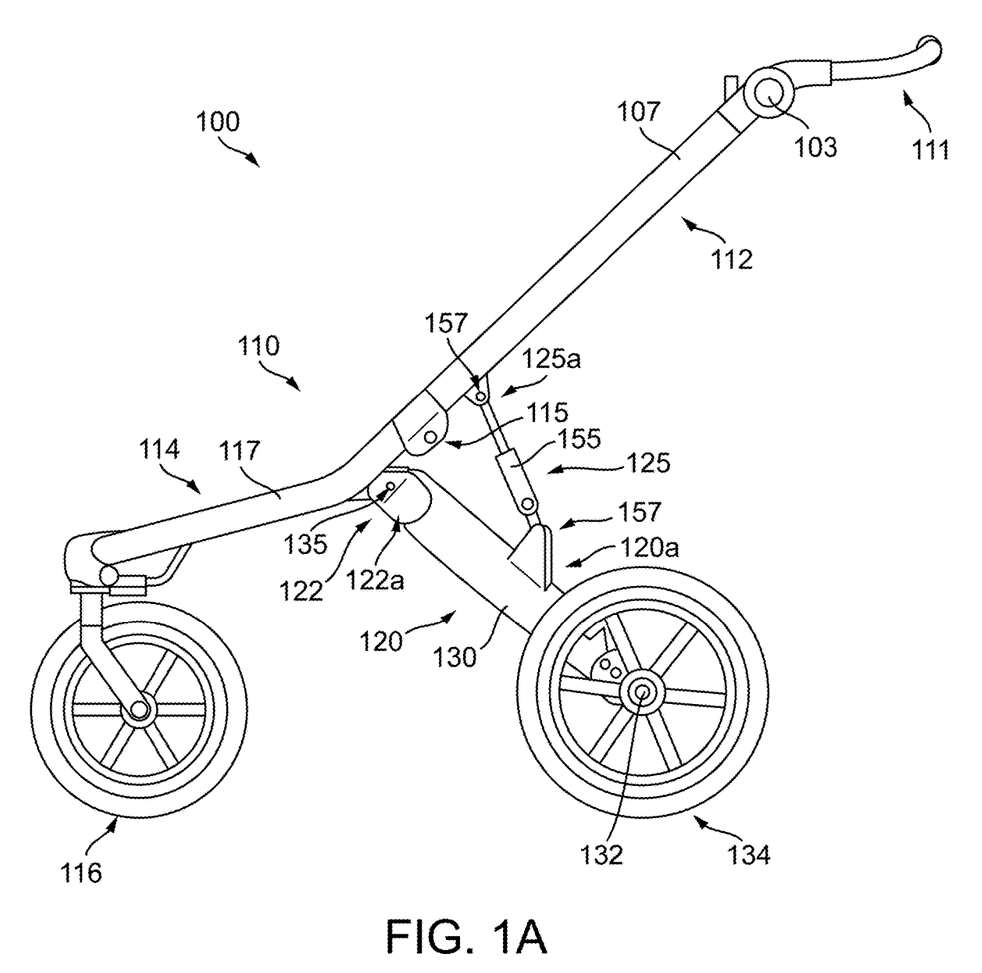
FIG. 1A shows a side view of an embodiment of a collapsible stroller in an extended configuration consistent with implementations of the current subject matter.
Figure 1B:
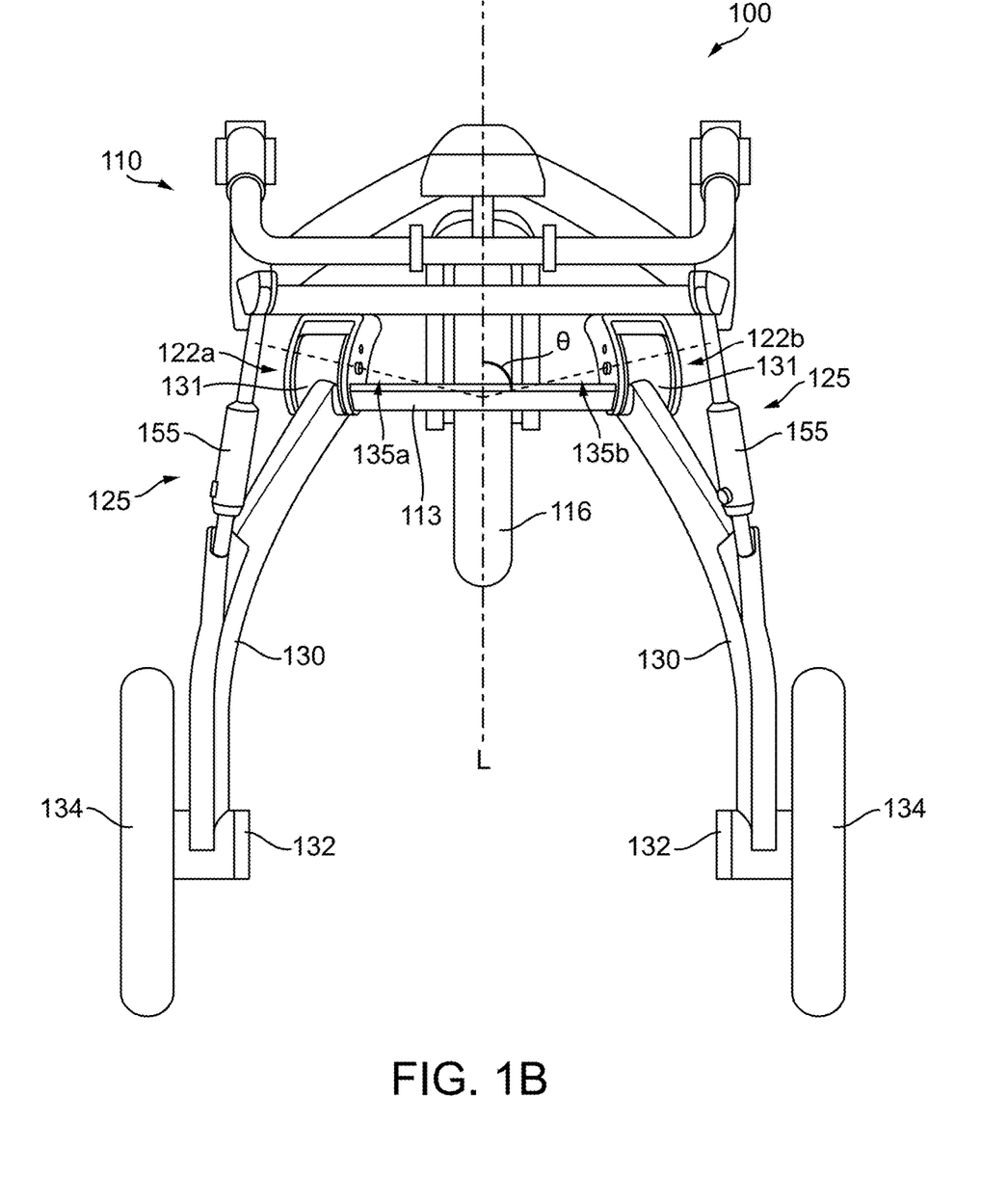
FIG. 1B shows a top perspective view of the collapsible stroller of FIG. 1A.
Figure 1C:
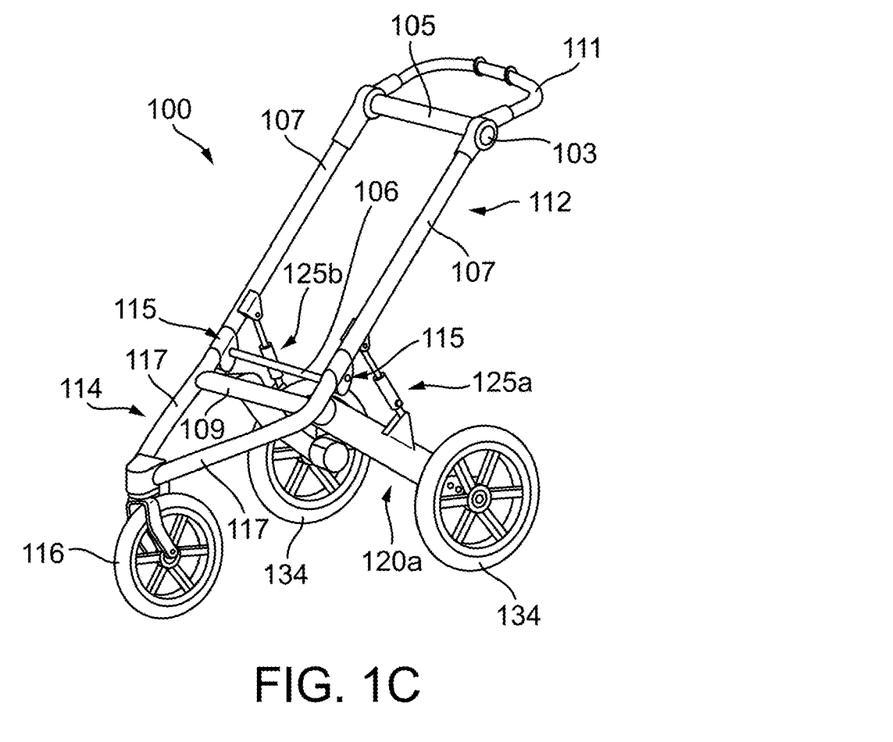
FIG. 1C shows a front perspective view of the collapsible stroller of FIG. 1A.
Figure 1D:
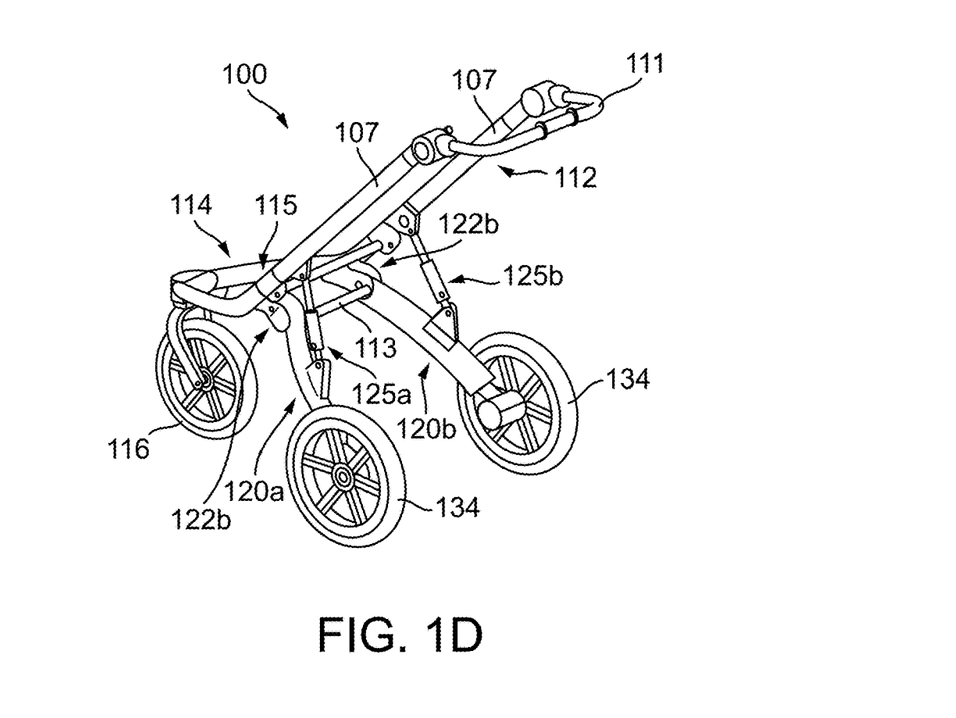
FIG. 1D shows a back perspective view of the collapsible stroller of FIG. 1A.
Figure 1E:
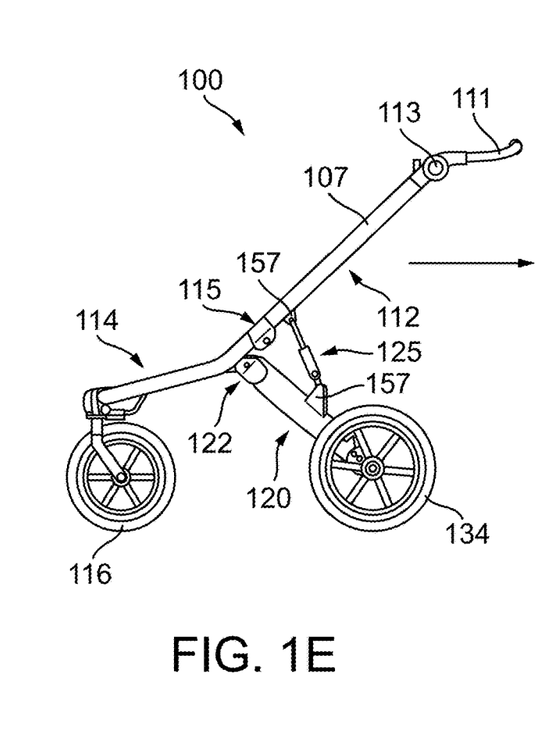
FIG. 1E shows a side view of the collapsible stroller of FIG. 1A.
Figure 1F:
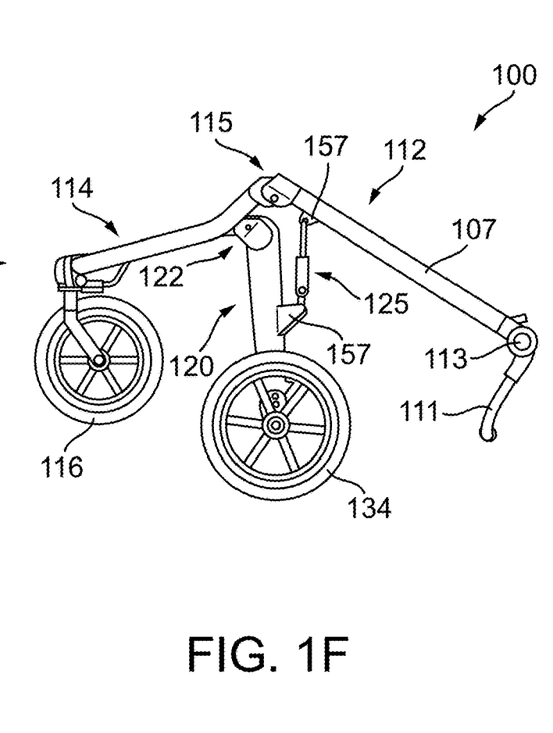
FIG. 1F shows a side view of the collapsible stroller of FIG. 1E transitioning into the collapsed configuration.
Figure 1G:
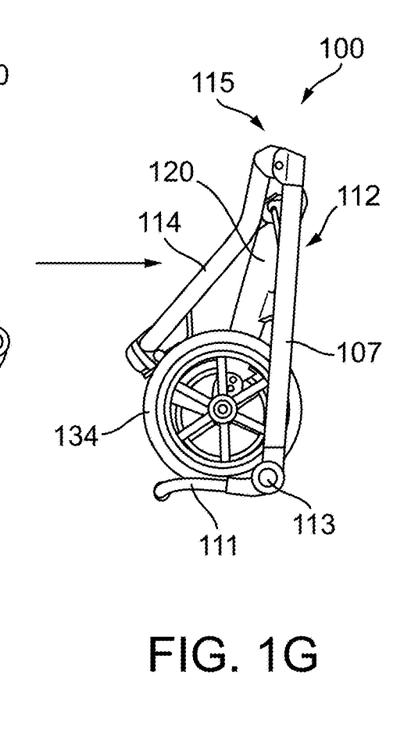
FIG. 1G shows a side view of the collapsible stroller of FIG. 1E in the collapsed configuration.
Figure 1H:
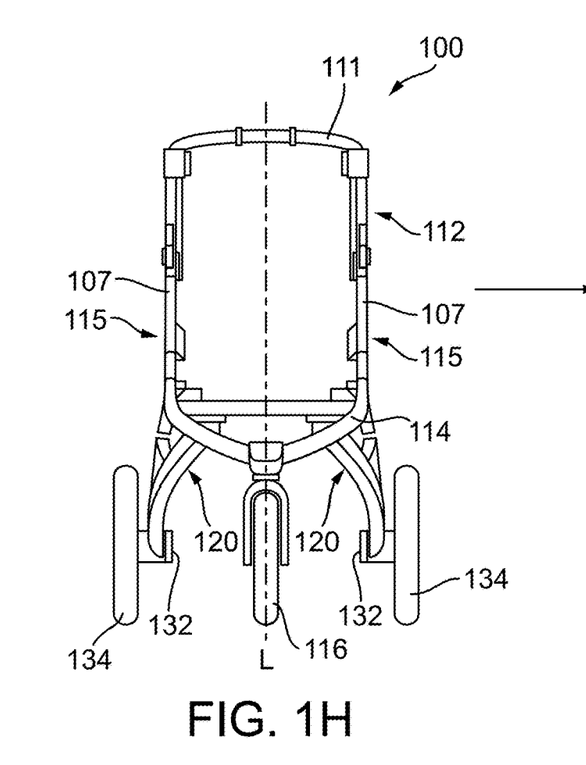
FIG. 1H shows a front view of the collapsible stroller of FIG. 1A.
Figure 1I:
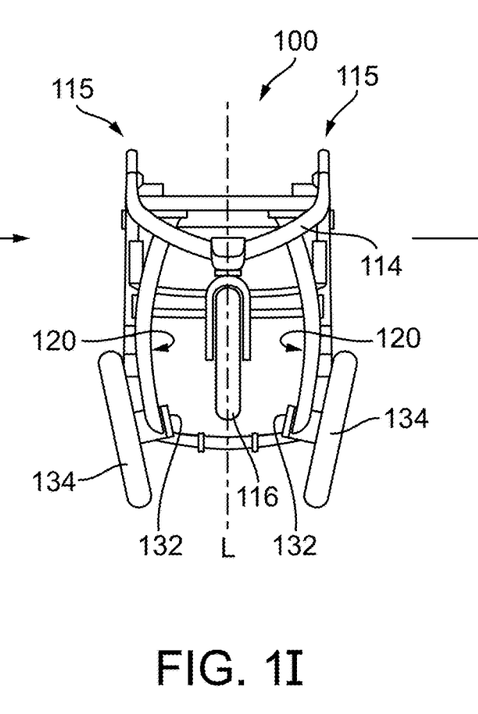
FIG. 1I shows a top view of the collapsible stroller of FIG. 1H transitioning into the collapsed configuration.
Figure 1J:
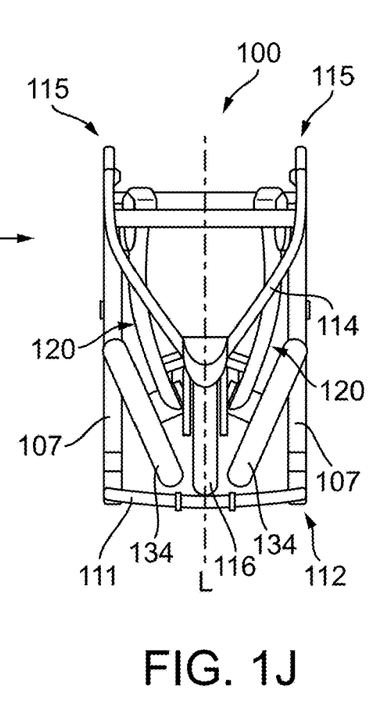
FIG. 1J shows a top view of the collapsible stroller of FIG. 1H in the collapsed configuration.
Figure 1K:
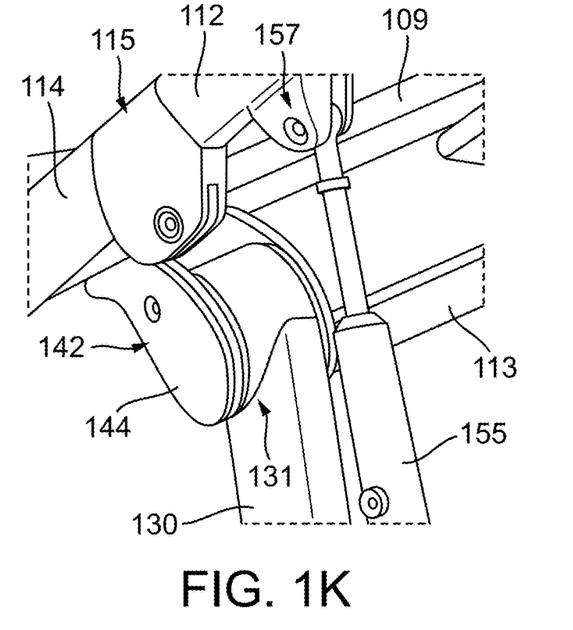
FIG. 1K shows a side perspective view of an angled hinge assembly of the collapsible stroller of FIG. 1A.
Figure 1L:
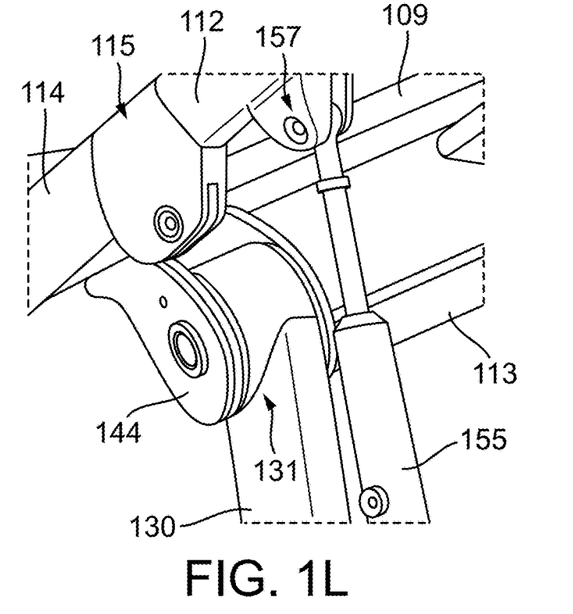
FIG. 1L shows a partial side perspective view of the angled hinge assembly of FIG. 1K showing a hub bracket.
Figure 1M:
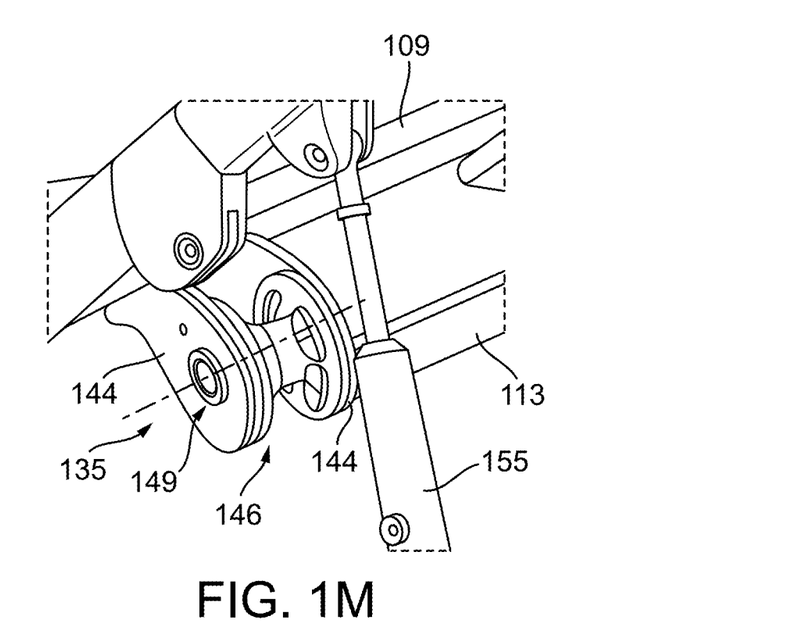
FIG. 1M shows a partial side perspective view of the angled hinge assembly of FIG. 1K showing hub bushings.
Figure 1N:
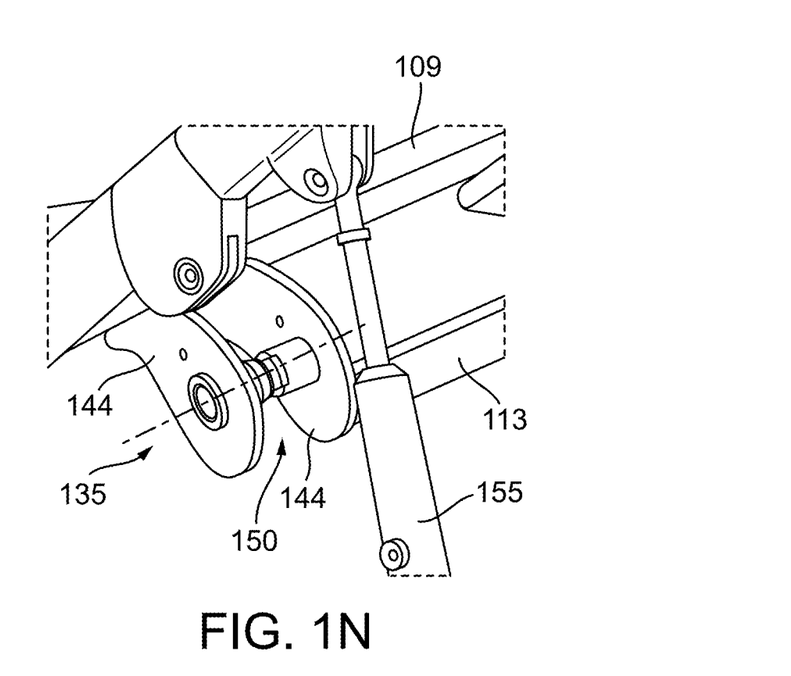
FIG. 1N shows a partial side perspective view of the angled hinge assembly of FIG. 1K showing a pivot bolt assembly.
Figure 1O:
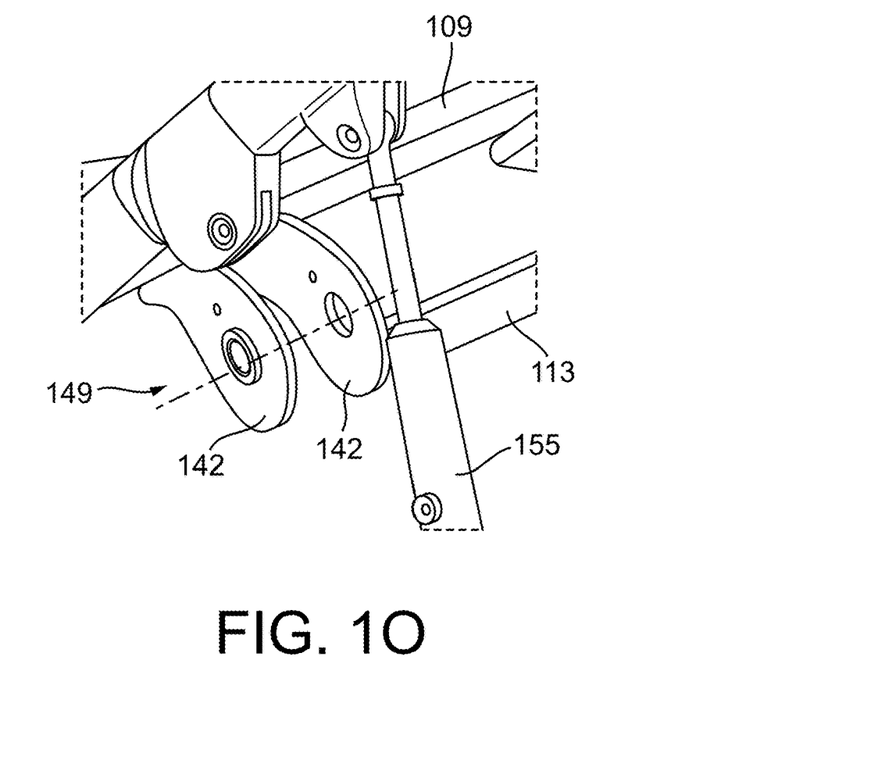
FIG. 1O shows a partial side perspective view of the angled hinge assembly of FIG. 1K showing parallel extensions extending from the bottom frame.
Figure 1P:
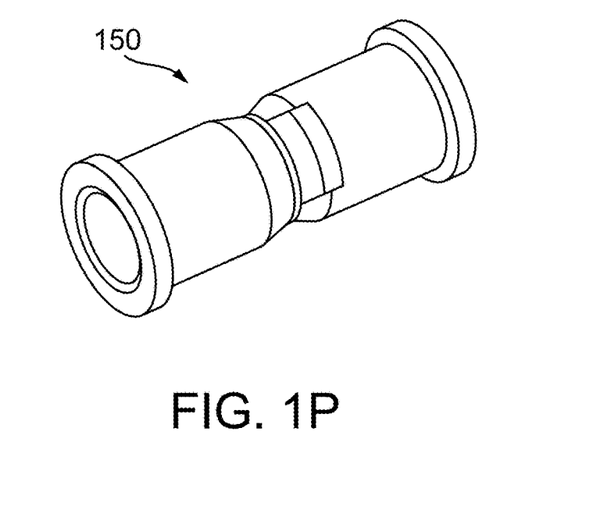
FIG. 1P shows a perspective view of the pivot bolt assembly of FIG. 1N.
Figure 1Q:
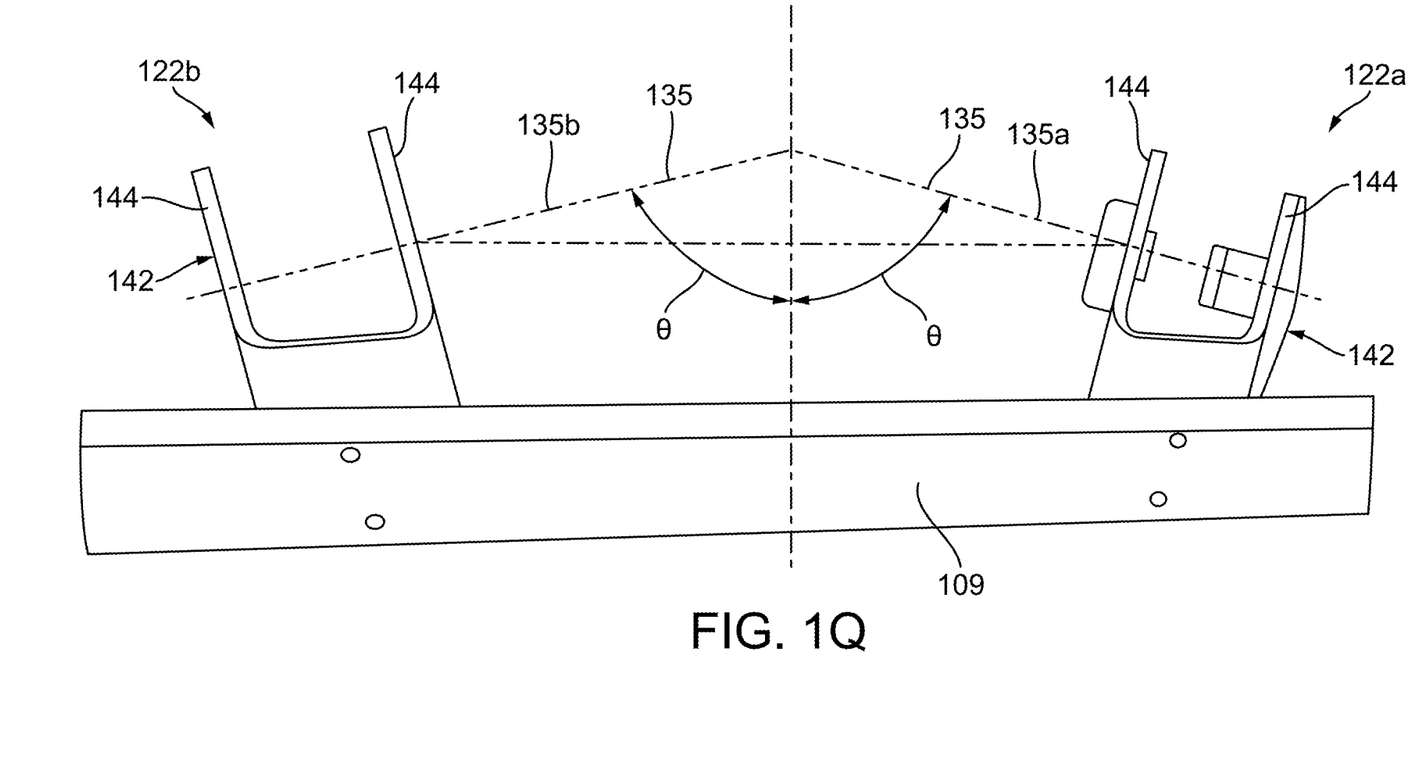
FIG. 1Q shows a partial top perspective view of the bottom frame of the collapsible stroller of FIG. 1A showing an axis of rotation of each of the angled hinge assemblies relative to a longitudinal plane of the collapsible stroller.
Figure 1R:
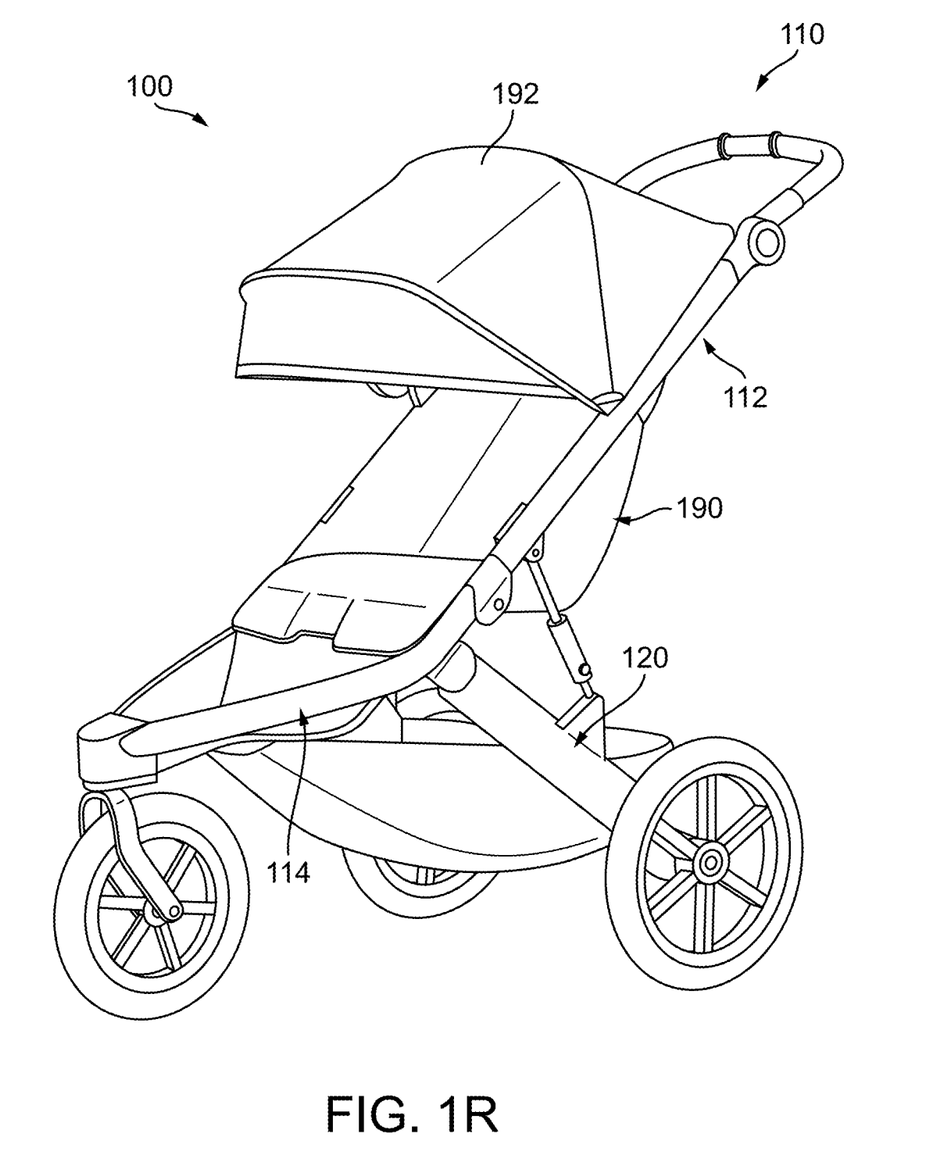
FIG. 1R shows a side perspective view of an embodiment of the collapsible stroller of FIG. 1A showing a material seating element coupled to the foldable frame assembly.

FIGS. 1A-1R illustrate an embodiment of a collapsible stroller 100 consistent with the current subject matter. As shown in FIGS. 1A-1J, the collapsible stroller 100 can include a foldable frame assembly 110 that includes a top frame 112 pivotably coupled to a bottom frame 114. As shown in FIG. 1C, the bottom frame 114 can include a frame cross bar 109 and a pair of bottom side bars 117. The bottom side bars 117 can each include a first end coupled to opposing ends of the frame cross bar 109, as shown in FIG. 1C. The bottom side bars 117 can also couple to each other at a second end of each bottom side bar 117, as also shown in FIG. 1C. As also shown in FIGS. 1E-1J, the bottom frame 114 can be coupled to a front wheel 116. For example, the front wheel 116 can be coupled to the second ends of the bottom side bars 117.

In some embodiments, the top frame 112 can include a pair of top side bars 107 that each couple to opposing ends of a handlebar 111, as shown in FIG. 1C. The handlebar 111 can be configured to allow a user to push and/or steer the collapsible stroller 100. In some embodiments, the handlebar 111 can be coupled to the top side bars 107 via handlebar pivot joints 103 that allow the handlebar 111 to form more than one configuration relative to the top side bars 107, such as form more than one angle between the handlebar 111 and the top side bars 107. For example, the handlebar 111 can form an angle between approximately 180 degrees and approximately 90 degrees relative to the top side bars 107. A handlebar support structure 105 can extend between the handlebar pivot joints 103 to assist with providing structural support for the top frame 112 of the foldable frame assembly 110.

The foldable frame assembly 110 can include a pair of frame joints 115 that pivotably couple the top frame 112 to the bottom frame 114 and assist with allowing the foldable frame assembly 110 to move between an expanded configuration, as shown, for example, in FIGS. 1E and 1H, and a collapsed configuration, as shown, for example, in FIGS. 1G and 1J. As shown in FIGS. 1F and 1I, the top frame 112 and bottom frame 114 can pivot toward each other along a longitudinal plane L (with the pivot points being the frame joints 115) to form the collapsed configuration. The frame joints 115 can include and/or be controlled by a releasable locking mechanism that allows a user to selectively cause the foldable frame assembly 110 to pivot into the collapsed configuration and/or the extended configuration. A frame joint support structure 106 can extend between the frame joints 115, as shown in FIG. 1C, to assist with providing structural support for the foldable frame assembly 110, such as when in the expanded configuration.

As shown in FIGS. 1A-1J, the collapsible stroller 100 can include two strut assemblies 120 coupled to the bottom frame 114, with each strut assembly 120 coupled to the bottom frame 114 via an angled joint assembly 122. In some embodiments, each strut assembly 120 can be coupled to the top frame 112 via a suspension assembly 125, as shown in FIGS. 1A-1J. As will be described in greater detail below, the coupling of each of the strut assemblies 120 to the top frame 112 and bottom frame 114 allow the collapsible stroller 100 to provide effective steering and comfortable passenger riding while achieving an improved compact configuration, such as at least compared to some currently available jogging and/or collapsible strollers.

As shown in FIG. 1B, the foldable frame assembly 110 can include a first strut assembly 120a coupled to the bottom frame 114 via a first angled joint assembly 122a and coupled to the top frame 112 via a first suspension assembly 125a. As also shown in FIG. 1B, the foldable frame assembly 110 can include a second strut assembly 120b that is coupled to the bottom frame 114 via a second angled joint assembly 122b and coupled to the top frame 112 via a second suspension assembly 125b. The first strut assembly 120a and the second strut assembly 120b can include the same or similar functions and features. As such, description of the strut assembly 120 can apply to the description of the first strut assembly 120a and the second strut assembly 120b. Similarly, the first angled joint assembly 122a and the second angled joint assembly 122b can include the same or similar functions and features. As such, description of the angled strut assembly 122 can apply to the description of the first angled joint assembly 122a and the second joint assembly 122b. Furthermore, description of the suspension assembly 125 can apply to the description of the first suspension assembly 125a and the second suspension assembly 125b.

As shown in FIG. 1B, the strut assembly 120 can include a structural support 130 that extends between a first support end 131 and a rear axle 132. The first support end 131 can form a part of the angled joint assembly 122, as shown in FIGS. 1K and 1L. The rear axle 132 can be configured to couple a rear wheel 134 thereto, as shown in FIG. 1B. In some embodiments, the structural support 130 can have a curved shape along a length of the structural support 130, as shown, for example, in FIG. 1B.

As shown in FIGS. 1B and 1Q, the first angled joint assembly 122a can be positioned at an angle relative to the second angled joint assembly 122b. For example, the first angled joint assembly 122a can have a first axis of rotation 135a that is not parallel to and not coaxial with a second axis of rotation 135b of the second angled joint assembly 122b. In some embodiments, the first axis of rotation 135a and the second axis of rotation 135b can extend along different planes. As shown in FIGS. 1B and 1Q, the first axis of rotation 135a and the second axis of rotation 135b can intersect a longitudinal plane L of the collapsible stroller 100 at an angle θ that is approximately 70 degrees to approximately 80 degrees. As will be described in greater detail below, such angled positioning of the first angled joint assembly 122a and the second angled joint assembly 122b can allow the first strut assembly 120a and the second strut assembly 120b, respectively, to pivot towards each other (e.g., towards the longitudinal plane L) and towards the top frame 112 when the collapsible stroller 100 moves into the collapsed configuration, as shown in FIGS. 1E-1J. As shown in FIG. 1B, the longitudinal plane L can extend along a longitudinal axis of the foldable frame assembly 110.

As shown in FIGS. 1G and 1J, when the foldable frame assembly 110 is in the collapsed configuration as a result of the strut assemblies 120 and the suspension assemblies 125 pivoting inward towards the longitudinal plane L, the strut assemblies 120 and suspension assemblies 125 can be positioned within or at least substantially within a border formed by at least the top side bars 107 and handlebar 111 of the top frame 112. As such, in the collapsed configuration, the maximum width of the collapsible stroller 100 can be defined by and/or no greater than a distance between the outer sides of the top side bars 107 of the top frame 112, as shown in FIG. 1J. Additionally, when the foldable frame assembly 110 is in the collapsed configuration, the rear wheels 134 can be positioned at least substantially adjacent the front wheel 116, as shown in FIG. 1J. For example, when the foldable frame assembly 110 is in the expanded configuration, the rear wheels 134 can be spaced approximately 22 inches to approximately 25 inches apart, such as approximately 23.5 inches apart. Furthermore, when the foldable frame assembly 110 is in the collapsed configuration, the rear wheels 134 can be spaced approximately 10 inches to approximately 12 inches apart, such as approximately 11 inches apart). Such reduction in overall width of the collapsible stroller 100 between the extended and collapsed configurations can allow the collapsible stroller 100 to achieve an effective compact size, such as for storing and transporting in the compact configuration.

In some embodiments, the collapsible stroller 100 can have a height of approximately 43 inches in the expanded configuration (as shown in FIG. 1E) and approximately 29 inches high in the collapsed configuration (as shown in FIG. 1G). Additionally, the collapsible stroller 100 can have a length (e.g., front to back distance) of approximately 39 inches in the expanded configuration (as shown in FIG. 1E) and approximately 16 inches long in the collapsed configuration (as shown in FIG. 1G). Furthermore, the collapsible stroller 100 can have a width (e.g., side to side distance) of approximately 25 inches in the expanded configuration (as shown in FIG. 1H) and approximately 17 inches wide in the collapsed configuration (as shown in FIG. 1J). Other configurations and dimensions of the collapsible stroller 100 are within the scope of this disclosure.

At least some currently available strollers include a cross-bar between a set of wheels, such as between a set of rear wheels, such as to assist with securing the position of the back wheels relative to each other. The collapsible stroller 100 of the present disclosure does not include a cross-bar or structure that extends between the rear axles 132 or rear wheels 134. Instead, the collapsible stroller 100 can include a hub cross-bar 113 that extends between the angled joint assemblies 122, as shown in FIG. 1B, and can provide structural support and stability for the collapsible stroller 100, as well as allow other benefits associated with the collapsible stroller 100. For example, the hub cross-bar 113 can allow the strut assemblies 120, such as the first strut assembly 120a and the second strut assembly 120b, to move and pivot independently of each other. Such independent movement and pivoting towards the longitudinal plane L can allow the collapsible stroller 100 to form the desired compact configuration (e.g., the rear wheels 134 can move closer to each other) and achieve smooth and stable steering and movement (e.g., due to suspension systems 125), as will be described further below. The hub cross-bar 113 can also prevent the strut assemblies 120 from pivoting towards each other (e.g., towards the longitudinal plane L) when maintaining the extended configuration.

FIGS. 1K-1P illustrate an embodiment of the angled joint assembly 122 of the collapsible stroller 100 with FIGS. 1L-1P including at least one part of the angled joint assembly 122 hidden. The angled joint assembly 122 can allow a respective strut assembly 120 to maintain alignment (including a range of alignments) with at least the bottom frame 114 thereby allowing the collapsible stroller 100 to achieve smooth and stable steering and movement. As shown in FIGS. 1K-1Q, the angled joint assembly 122 can include a hub bracket 142 that extends from the bottom frame 114, such as extends from the frame cross-bar 109. The hub bracket 142 can include a pair of parallel extensions 144 that are spaced to provide a hub bushing 146 including a hub axis 149 to be positioned therebetween, as shown in FIG. 1M. The first support end 131 of the strut assembly 120 can be coupled to the hub bushing 146 and also positioned between the parallel extensions 144, such as shown in FIGS. 1K and 1L, to thereby allow the strut assembly 120 to pivot along the hub axis 149, as well as maintain alignment with the hub bracket 142. For example when the hub bushing 146 is coupled to the hub bracket 142, the hub axis 149 is collinear with the axis of rotation 135 of the angled joint assembly 122 and thus allows the strut assembly 120 to pivot toward the longitudinal plane L of the collapsible stroller 100 when the foldable frame assembly 110 is transitioned into the collapsed configuration.

As shown in FIGS. 1N and 1P, a pivot bolt assembly 150 can extend along the hub axis 149 to provide a stable axis of rotation, such as for allowing the strut assembly 120 to maintain a position and/or achieve a range of positions relative to the bottom frame 114. As such, the rear wheels 134 coupled to the strut assemblies 120 can be maintained at a desired alignment and/or range of alignments relative to the bottom frame 114 and/or to the longitudinal plane. For example, the angling of at least the angled joint assembly 122, including the hub axis 149 and the axis of rotation, the rear wheels 134 can be aligned parallel to each other when the collapsible stroller 100 is in the expanded position, as shown in FIG. 1B. Additionally, the rear wheels 134 can be angled relative to each other when collapsible stroller is in the collapsed configuration, as show in FIG. 1J.

As discussed above, the axis of rotation 135 of the first and second angled joint assemblies 122a, 122b are non-parallel and not coaxial with each other to allow the strut assemblies to pivot towards the longitudinal plane L of the collapsible stroller 100 when moving into the collapsed configuration. Such pivoting inward allows for a compact collapsed configuration. As such, the angled joint assembly 122 can assist with achieving the compact collapsed configuration of the collapsible stroller 100, as well as assist with achieving efficient and effective steering and movement of the collapsible stroller (e.g., maintaining the rear wheels 134 parallel to each other when the collapsible stroller 100 is in the extended configuration).

As shown in FIG. 1A, the collapsible stroller 100 can include a suspension assembly 125 that can be a part of and/or integrated with the foldable frame assembly 110. As shown in FIG. 1A, the suspension assembly 125 can extend between the top frame 112 and the strut assembly 120. For example, the suspension assembly 125 can be pivotable relative to the top frame 112 and the strut assembly 120 to allow the suspension assembly 125 to pivot towards and away from the longitudinal plane L when transitioning the collapsible stroller 100 between the collapsed and extended configurations, respectively.

For example, the suspension assembly 125 can include a shock absorber 155 extending between two ball joints 157. The first ball joint 157a can couple the shock absorber 155 to the top frame 112 and the second ball joint 157b can couple the shock absorber 155 to the strut assembly 120, as shown in FIG. 1A. As shown in FIG. 1B, the collapsible stroller 100 can include a first suspension assembly 125a extending between the top frame 112 and the first strut assembly 120a, as well as a second suspension assembly 125b extending between the top frame 112 and the second strut assembly 120b. The first suspension assembly 125a can be the same as or substantially the same as the second suspension assembly 125b such that disclosure of the suspension assembly 125 can apply to the first and second suspension assemblies 125a, 125b. The ball joints 157 coupling the shock absorber 155 to the top frame 112 and the strut assembly 120 can allow for three-dimensional movement of the shock absorber 155 and thus allow the strut assembly 120 and the suspension assembly 125 to pivot toward the longitudinal plane L of the collapsible stroller 100, as shown in FIGS. 1H-1J. As such, the suspension assembly 125 can provide shock absorption (via the shock absorber 155), such as absorb shock as a result of the rear wheel 134 going over an uneven surface, as well as allow the strut assembly 120 and suspension assembly 125 to pivot inward toward the longitudinal plane L of the collapsible stroller 100 to assist with forming the compact collapsed configuration.

The first and second suspension assemblies 125a, 125b can further allow the first and second strut assemblies 125a, 125b, respectively, to move independently. For example, movement of the rear wheel 134 associated with the first strut assembly 125a can travel over an uneven surface thereby causing the associated first shock absorber 155a of the first suspension assembly 125a to activate (e.g., compress) and absorb at least some movement of the first strut assembly 120a caused by such travel. Additionally, although the first strut assembly 120a may be caused to move (e.g., relative to the top frame 112) and the associated shock absorber 155 activated, the second strut assembly 120b may not move (e.g., relative to the top frame 112) and thus the associated second shock absorber 155 not activated, such as if the rear wheel 134 associated with the second strut assembly 120b travels over an even surface. As such, movement and shock absorption of the first strut assembly 120a can be independent of movement and shock absorption of the second strut assembly 120b, thereby providing stable and smooth steering and movement of the collapsible stroller 100.

FIG. 1R illustrates an embodiment of a material seating portion 190 coupled to the foldable frame assembly. The material seating portion 190 can provide seating and support for a rider of the collapsible stroller (e.g., a child). The material seating portion 190 can be flexible to allow the collapsible stroller to form the collapsed and expanded configurations. Other features having various functions can also be coupled to the foldable frame assembly, such as a retractable shade 192. Other features and functions associated with the collapsible stroller 100 are within the scope of this disclosure.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A stroller assembly, comprising:
    a foldable frame assembly, comprising:
        a top frame including a handle bar;
        a bottom frame pivotably coupled to the top frame such that the top frame is allowed to pivot along a longitudinal plane of the foldable frame assembly, the foldable frame assembly forming a collapsed configuration as a result of the top frame pivoting towards the bottom frame, the foldable frame assembly forming an extended configuration as a result of the top frame pivoting away from the bottom frame;
        a first strut assembly pivotably coupled to the bottom frame at a first angled joint, the first strut assembly including a first rear wheel axle, the first angled joint including a first axis of rotation that is angled relative to the longitudinal plane such that the first rear wheel axle pivots towards the longitudinal plane as the top frame pivots towards the bottom frame for forming the collapsed configuration;
        a second strut assembly pivotably coupled to the bottom frame at a second angled joint, the second strut assembly including a second rear wheel axle, the second angled joint including a second axis of rotation that is angled relative to the longitudinal plane such that the second rear wheel axle pivots towards the longitudinal plane as the top frame pivots towards the bottom frame, the first axis of rotation and the second axis of rotation extending at an angle relative to each other;
    a first suspension system including a first shock absorber, the first suspension system extending between the top frame and the first strut assembly; and
    a second suspension system including a second shock absorber and extending between the top frame and the second strut assembly,
    wherein the first suspension system is coupled to the first strut assembly via a first ball joint that allows three dimensional pivoting, and the first suspension system is coupled to the top frame via a second ball joint that allows three dimensional pivoting, the three dimensional pivoting allowing the first suspension system and the first strut assembly to pivot towards the longitudinal plane as the top frame pivots towards the bottom frame.

2. The stroller assembly of claim 1, wherein the first axis of rotation forms a first angle with the longitudinal plane, the first angle being approximately 70 degrees to approximately 80 degrees.

3. The stroller assembly of claim 2, wherein the second axis of rotation forms a second angle with the longitudinal plane, the second angle being approximately 70 degrees to approximately 80 degrees.

4. The stroller assembly of claim 3, wherein the first axis of rotation and the second axis of rotation extend along different planes.

5. The stroller assembly of claim 1, wherein the first rear wheel axle is configured to couple a first rear wheel and the second rear wheel axle is configured to couple a second rear wheel.

6. The stroller assembly of claim 5, wherein the first rear wheel and the second wheel form a first wheel distance therebetween when then the foldable frame assembly is in the collapsed configuration, the first rear wheel and the second wheel forming a second wheel distance therebetween when then the foldable frame assembly is in the extended configuration, the second wheel distance being longer than the first wheel distance.

7. The stroller assembly of claim 5, wherein the first wheel is positioned parallel to the second wheel when the foldable frame assembly is in the extended configuration, the first wheel being positioned at a third angle relative to the second wheel when the foldable frame assembly is in the collapsed configuration.

8. The stroller assembly of claim 1, further comprising a material seating portion coupled to the foldable frame assembly.

9. A method of forming a collapsed configuration of a foldable frame assembly of a stroller assembly, the method comprising:
    pivoting, along a longitudinal plane of the foldable frame assembly, a top frame of the foldable frame assembly towards a bottom frame of the foldable frame assembly:
    pivoting, as a result of the pivoting of the top frame towards the bottom frame, a first strut assembly and a first suspension assembly towards the longitudinal plane; and pivoting, as a result of the pivoting of the top frame towards the bottom frame, a second strut assembly and a second suspension assembly towards the longitudinal plane, wherein the first strut assembly is pivotably coupled to the bottom frame at a first angled joint, the first strut assembly including a first rear wheel axle, the first angled joint including a first axis of rotation that is angled relative to the longitudinal plane to cause the first rear wheel axle to pivot towards the longitudinal plane as a result of the top frame pivoting towards the bottom frame, the first axis of rotation and the second axis of rotation extending at an angle relative to each other, and wherein the first suspension system is coupled to the first strut assembly via a first ball joint that allows three dimensional pivoting, and the first suspension system is coupled to the top frame via a second ball joint that allows three dimensional pivoting, the three dimensional pivoting allowing the first suspension system and the first strut assembly to pivot towards the longitudinal plane as the top frame pivots towards the bottom frame.

10. The method of claim 9, wherein the first strut assembly pivots independently from the second strut assembly.

11. The method of claim 9, wherein the first axis of rotation forms a first angle with the longitudinal plane, the first angle being approximately 70 degrees to approximately 80 degrees.

12. The method of claim 9, wherein the first suspension system includes a first shock absorber, the first suspension system extending between the top frame and the first strut assembly.

13. The method of claim 9, wherein the first rear wheel axle is configured to couple a first rear wheel to the first strut assembly.

14. The method of claim 9, wherein the stroller assembly further comprises a material seating portion coupled to the top frame and the bottom frame.

\* \* \* \* \*